(12) United States Patent
Nagata et al.

(10) Patent No.: US 10,744,700 B2
(45) Date of Patent: Aug. 18, 2020

(54) DECORATIVE SHEET, AND MOLDED SHEET AND PRODUCING METHOD THEREOF

(71) Applicant: DAIHATSU MOTOR CO., LTD., Osaka (JP)

(72) Inventors: Jun Nagata, Osaka (JP); Akira Sakabe, Osaka (JP); Kazuyoshi Baba, Osaka (JP)

(73) Assignee: DAIHATSU MOTOR CO., LTD., Osaka (JP)

( * ) Notice: Subject to any disclaimer, the term of this patent is extended or adjusted under 35 U.S.C. 154(b) by 235 days.

(21) Appl. No.: 15/561,399

(22) PCT Filed: Dec. 9, 2015

(86) PCT No.: PCT/JP2015/084557
§ 371 (c)(1),
(2) Date: Sep. 25, 2017

(87) PCT Pub. No.: WO2016/163053
PCT Pub. Date: Oct. 13, 2016

(65) Prior Publication Data
US 2018/0104886 A1    Apr. 19, 2018

(30) Foreign Application Priority Data

Apr. 8, 2015   (JP) ................ 2015-078917

(51) Int. Cl.
| | |
|---|---|
| *B29C 51/12* | (2006.01) |
| *B29C 51/14* | (2006.01) |
| *B32B 27/00* | (2006.01) |
| *B32B 27/30* | (2006.01) |
| *B29C 70/36* | (2006.01) |

(Continued)

(52) U.S. Cl.
CPC .............. *B29C 51/12* (2013.01); *B29C 51/14* (2013.01); *B29C 70/36* (2013.01); *B32B 7/06* (2013.01);
(Continued)

(58) Field of Classification Search
CPC .......... B29C 51/12; B29C 51/14; B29C 70/36
See application file for complete search history.

(56) References Cited

U.S. PATENT DOCUMENTS

| | | |
|---|---|---|
| 2011/0229681 A1 | 9/2011 | Sakamoto et al. |
| 2013/0209819 A1 | 8/2013 | Noda et al. |

FOREIGN PATENT DOCUMENTS

| | | |
|---|---|---|
| CN | 1532223 A | 9/2004 |
| EP | 2746357 A1 | 6/2014 |

(Continued)

OTHER PUBLICATIONS

Polypropylene, Wikipedia publication, Jan. 5, 2020.*
(Continued)

*Primary Examiner* — Victor S Chang
(74) *Attorney, Agent, or Firm* — Edwards Neils LLC; Jean C. Edwards, Esq.

(57) ABSTRACT

A decorative sheet includes a releasing layer, a pressure-sensitive adhesive layer disposed on a surface of the releasing layer, and a skin layer disposed on a surface of the pressure-sensitive adhesive layer. The releasing layer includes a shape-holding layer, both the shrinkage ratio of the shape-holding layer and the shrinkage ratio of the skin layer are 0/1000 to 9/1000, and both the softening start temperature of the shape-holding layer and the softening start temperature of the skin layer are 60° C. or more and 120° C. or less.

6 Claims, 2 Drawing Sheets

(51) Int. Cl.
  *B32B 38/18* (2006.01)
  *B32B 7/06* (2019.01)
  *B32B 7/12* (2006.01)
  *B32B 27/08* (2006.01)
  *B32B 27/36* (2006.01)
  *B32B 37/06* (2006.01)
  *B32B 37/10* (2006.01)

(52) U.S. Cl.
  CPC ................ *B32B 7/12* (2013.01); *B32B 27/00* (2013.01); *B32B 27/08* (2013.01); *B32B 27/302* (2013.01); *B32B 27/304* (2013.01); *B32B 27/308* (2013.01); *B32B 38/1858* (2013.01); *B32B 27/36* (2013.01); *B32B 37/06* (2013.01); *B32B 37/1009* (2013.01)

(56) References Cited

FOREIGN PATENT DOCUMENTS

| | | |
|---|---|---|
| JP | 58-203049 A | 11/1983 |
| JP | H01-20048 B2 | 4/1989 |
| JP | H05-245981 A | 9/1993 |
| JP | 11-166163 A | 6/1999 |
| JP | 2002-052568 A | 2/2002 |
| JP | 2006-264321 A | 10/2006 |
| JP | 2007-190702 A | 8/2007 |
| JP | 2012-091498 A | 5/2012 |
| JP | 2015-000915 A | 1/2015 |
| JP | 5694641 B2 | 2/2015 |
| WO | 2010/058705 A1 | 5/2010 |
| WO | 2014/105615 A1 | 7/2014 |

OTHER PUBLICATIONS

Polyethylene, Wikipedia publication, Jan. 5, 2019.*
International Search Report issued in connection with International Patent Application No. PCT/JP2015/084557 dated Mar. 15, 2016.
Written Opinion issued in connection with International Patent Application No. PCT/JP2015/084557 dated Mar. 15, 2016.
International Preliminary Report on Patentability issued by WIPO dated Oct. 19, 2017, in connection with International Patent Application No. PCT/JP2015/084557.

* cited by examiner

DECORATIVE SHEET, AND MOLDED SHEET AND PRODUCING METHOD THEREOF

CROSS-REFERENCE TO RELATED APPLICATIONS

The present invention is a 35 U.S.C. 371 National Stage Entry of PCT/JP2015/084557, filed Dec. 9, 2015, which claims priority from Japanese Patent Application No. 2015-078917, filed on Apr. 8, 2015, the contents of all of which are herein incorporated by reference in their entirety.

TECHNICAL FIELD

The present invention relates to a decorative sheet, a molded sheet, and a method for producing the molded sheet, to be specific, to a decorative sheet, a molded sheet obtained by molding the decorative sheet, and a method for producing the molded sheet.

BACKGROUND ART

Conventionally, it has been known that a decorative sheet such as decorative material is attached to the interior and the exterior of vehicles, buildings, or the like to impart design properties thereto. To be more specific, for example, it has been known that a decorative sheet printed in carbon-like design is attached to an outer surface of the hood of an automobile to decorate the hood to be light in weight.

As such a decorative sheet, for example, an automobile interior component in which a soft skin material is compressively bonded onto a core material to integrally adhere to each other has been proposed (ref: for example, the following Patent Document 1).

The above-described automobile interior component is usually molded into a flat sheet shape. Then, at the time of its use, the automobile interior component is heated with a dryer or the like, and extended in accordance with the shape of an adherend to be attached thereto via an adhesive, an adhesive tape, or the like that are separately prepared.

However, there is a disadvantage that the automobile interior component has a complicated attachment work. Then, in order to improve the workability, for example, it has been proposed that an adhesive layer is laminated on the decorative sheet in advance, and furthermore, a releasing layer is laminated on the adhesive layer.

To be more specific, for example, a decorative sheet made by applying a synthetic resin pressure-sensitive adhesive to the rear surface of a vinyl chloride resin sheet and attaching a release paper thereto has been proposed (ref: for example, the following Patent Document 2).

In the above-described decorative sheet, the release paper is peeled at the time of its use, and the vinyl chloride resin sheet is compressively bonded (attached) to the adherend via the exposed synthetic resin pressure-sensitive adhesive.

CITATION LIST

Patent Document

Patent Document 1: Japanese Examined Patent Publication No. H1-020048
Patent Document 2: Japanese Unexamined Patent Publication No. H5-245981

SUMMARY OF THE INVENTION

Problem to be Solved by the Invention

However, the above-described decorative sheet is usually molded into a flat sheet shape. Thus, at the time of its use, the decorative sheet is required to be extended in accordance with the shape of the adherend to be attached thereto, and the attachment work is complicated.

Then, in order to improve the workability, it has been considered that the decorative sheet is heated and molded in advance to be then processed in accordance with the shape of the adherend.

However, when the above-described decorative sheet is heated, the decorative sheet may be deformed into an undesired shape or damage to the decorative sheet may occur, so that there is a disadvantage that the processability is poor.

An object of the present invention is to provide a decorative sheet having excellent processability and capable of achieving improvement of the workability at the time of attachment, a molded sheet obtained by molding the decorative sheet, and a method for producing the molded sheet.

Means for Solving the Problem

The present invention [1] includes a decorative sheet including a releasing layer, a pressure-sensitive adhesive layer disposed on a surface of the releasing layer, and a skin layer disposed on a surface of the pressure-sensitive adhesive layer, wherein the releasing layer includes a shape-holding layer, both the shrinkage ratio of the shape-holding layer and the shrinkage ratio of the skin layer are 0/1000 to 9/1000, and both the softening start temperature of the shape-holding layer and the softening start temperature of the skin layer are 60° C. or more and 120° C. or less.

The present invention [2] includes the decorative sheet described in the above-described [1], wherein the releasing layer further includes an easily releasing layer interposed between the pressure-sensitive adhesive layer and the shape-holding layer.

The present invention [3] includes the decorative sheet described in the above-described [1], wherein the shape-holding layer has easy releasability.

The present invention [4] includes a molded sheet obtained by molding the decorative sheet described in any one of the above-described [1] to [3].

The present invention [5] includes the molded sheet described in the above-described [4], wherein the decorative sheet is obtained by vacuum molding.

The present invention [6] includes a method for producing a molded sheet including the steps of preparing the decorative sheet described in any one of the above-described [1] to [3] and vacuum molding the decorative sheet, wherein in the vacuum molding, the skin layer-side is pre-heated at 120° C. or more and below 130° C., and the releasing layer-side is pre-heated at 130° C. or more and 140° C. or less.

Effect of the Invention

In the decorative sheet of the present invention, both the shrinkage ratio of the shape-holding layer and the shrinkage ratio of the skin layer are 0/1000 to 9/1000, and the softening start temperature of the shape-holding layer and the softening start temperature of the skin layer are 60° C. or more and 120° C. or less, so that deformation of the decorative sheet into an undesired shape and damage thereto can be suppressed at the time of molding.

Thus, the decorative sheet of the present invention has excellent processability, and furthermore, excellent workability at the time of attachment.

The molded sheet of the present invention is obtained by using the above-described decorative sheet, so that is has excellent processability, and furthermore, excellent workability at the time of attachment.

According to the method for producing a molded sheet of the present invention, the molded sheet of the present invention can be efficiently produced.

BRIEF DESCRIPTION OF THE DRAWINGS

FIG. 3 shows a schematic process drawing for illustrating one embodiment of a method for producing a molded sheet of the present invention:

DESCRIPTION OF EMBODIMENTS

Figure 1:
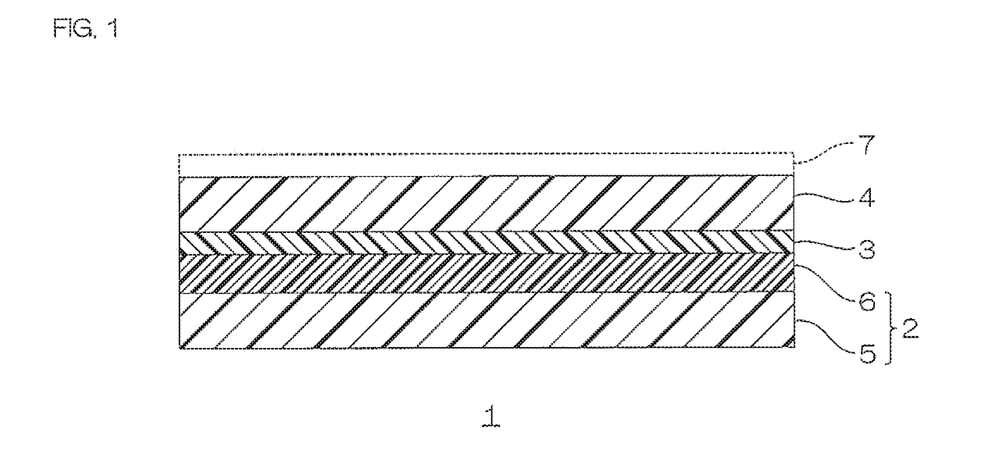
FIG. 1 shows a schematic configuration diagram for illustrating one embodiment of a decorative sheet of the present invention.

In FIG. 1, a decorative sheet 1 includes a releasing layer 2, a pressure-sensitive adhesive layer 3 that is disposed on the surface of the releasing layer 2, and a skin layer 4 that is disposed on the surface of the pressure-sensitive adhesive layer 3.

The releasing layer 2 is a sheet member that is attached to the pressure-sensitive adhesive layer 3 and is easily releasable from the pressure-sensitive adhesive layer 3 so as to protect the pressure-sensitive adhesive layer 3 and to support the skin layer 4. The releasing layer 2 includes a shape-holding layer 5 and an easily releasing layer 6 that is disposed on the upper surface of the shape-holding layer 5 and interposed between the pressure-sensitive adhesive layer 3 and the shape-holding layer 5.

Although the details are described later, when the decorative sheet 1 is molded, the shape-holding layer 5 is included in the releasing layer 2 so as to hold a desired shape.

The shape-holding layer 5 is, for example, formed into a sheet shape extending in a plane direction (direction perpendicular to a thickness direction, that is, right-left direction and front-rear direction), and has a generally rectangular shape when viewed from the top.

Examples of the shape-holding layer 5 include resin sheets, nonwoven fabrics, paper, and metal foils. These can be used alone or in combination of two or more. As the shape-holding layer 5, preferably, a resin sheet is used.

As the shape-holding layer 5, one having the shrinkage ratio and the softening start temperature within a predetermined range is selected.

To be more specific, the shrinkage ratio of the shape-holding layer 5 is 0/1000 or more, preferably 1/1000 or more, more preferably 2/1000 or more, further more preferably 4/1000 or more, and 9/1000 or less, preferably 8/1000 or less, more preferably 6/1000 or less.

The shrinkage ratio is measured in conformity with JIS K 7152 (1999) (hereinafter, the same).

The softening start temperature of the shape-holding layer 5 is 60° C. or more, preferably 80° C. or more, more preferably 95° C. or more, and 120° C. or less, preferably 110° C. or less, more preferably 105° C. or less.

The softening start temperature is the temperature at which deformation starts when a measuring object is heated in an unloaded state, and is measured in conformity with JIS K 7196 (1999).

As the shape-holding layer 5, preferably, one having the heat deflection temperature within a predetermined range is selected.

The heat deflection temperature of the shape-holding layer 5 is, for example, 50° C. or more, preferably 85° C. or more, more preferably 95° C. or more, and for example, 200° C. or less, preferably 150° C. or less, more preferably 110° C. or less.

The heat deflection temperature is the temperature at which deformation starts when a measuring object is heated in a loaded state, and is measured in conformity with ASTM D648.

To be specific, the heat deflection temperature shows the temperature at which in a state of applying a load (4.6 $kg/cm^2$) determined in the standard of the above-described test method, the temperature of the measuring object is increased and a degree of deflection shows a predetermined value (hereinafter, the same).

When the shape-holding layer 5 is a resin sheet, the shrinkage ratio, the softening start temperature, and the heat deflection temperature differ in accordance with the type of the resin constituting the resin sheet, the structure thereof, or the like.

Thus, as the shape-holding layer 5, preferably, the resin sheet having the shrinkage ratio, the softening start temperature, and the heat deflection temperature within the above-described range is selected.

To be specific, examples of the resin constituting the shape-holding layer 5 (the resin sheet) include crystalline resins such as ethylene vinyl acetate (EVA, shrinkage ratio of 7/1000 to 9/1000, softening start temperature of 89 to 113° C., heat deflection temperature of 77 to 81° C.) and non-crystalline resins such as acrylonitrile•butadiene•styrene copolymer (ABS, shrinkage ratio of 0/1000 to 9/1000, softening start temperature of 95 to 105° C., heat deflection temperature of 95 to 110° C.), polystyrene (PS, shrinkage ratio of 4/1000 to 7/1000, softening start temperature of 95 to 105° C., heat deflection temperature of 70 to 90° C.), acrylonitrile•styrene copolymer (AS, shrinkage ratio of 2/1000 to 7/1000, softening start temperature of 110 to 120° C., heat deflection temperature of 87 to 104° C.), and polyvinyl chloride (PVC, shrinkage ratio of 1/1000 to 5/1000, softening start temperature of 65 to 85° C., heat deflection temperature of 54 to 74° C.).

These resins constituting the shape-holding layer 5 can be used alone or in combination of two or more.

As the resin constituting the shape-holding layer 5, preferably, non-crystalline resins are used, more preferably, an acrylonitrile•butadiene•styrene resin (ABS) is used. In other words, as the shape-holding layer 5, preferably, a resin sheet made of an acrylonitrile•butadiene•styrene resin is used.

When the above-described resin sheet is used as the shape-holding layer 5, excellent shape-holding properties can be obtained.

The thickness of the shape-holding layer 5 is, for example, 100 µm or more, preferably 150 µm or more, more preferably 300 µm or more, and for example, 800 µm or less, preferably 600 µm or less, more preferably 500 µm or less.

The easily releasing layer 6 is a sheet member having easy releasability with respect to the pressure-sensitive adhesive layer 3, and is included so as to peel the releasing layer 2 (the shape-holding layer 5) from the pressure-sensitive adhesive layer 3.

The easily releasing layer 6 is, for example, formed into a sheet shape extending in the plane direction, and has a generally rectangular shape when viewed from the top.

Examples of the easily releasing layer 6 include resin sheets, nonwoven fabrics, paper, and metal foils. These can be used alone or in combination of two or more. As the easily releasing layer 6, preferably, a resin sheet is used.

The shrinkage ratio, the softening start temperature, and the heat deflection temperature of the easily releasing layer 6 are not particularly limited, and appropriately selected.

To be specific, examples of the resin constituting the easily releasing layer 6 (the resin sheet) include crystalline resins such as polypropylene (PP), ethylene vinyl acetate (EVA), polyethylene (PE, high density polyethylene (HDPE), or the like), polyacetal (POM), polybutylene terephthalate (PBT), polyethylene terephthalate (PET), polyphenylene sulfide (PPS), polyamide (PA, nylon 6, nylon 6,6, or the like), and polyether ether ketone (PEEK) and non-crystalline resins such as acrylonitrile•butadiene•styrene copolymer (ABS), polystyrene (PS), acrylonitrile•styrene copolymer (AS), polycarbonate (PC), polyvinyl chloride (PVC), and polymethyl methacrylate ester (PMMA).

These resins constituting the easily releasing layer 6 can be used alone or in combination of two or more.

As the resin constituting the easily releasing layer 6, preferably, crystalline resins are used, more preferably, polypropylene (PP) is used.

When the above-described resin is used as the resin constituting the easily releasing layer 6, excellent easy releasability can be obtained.

The thickness of the easily releasing layer 6 is, for example, 10 µm or more, preferably 30 µm or more, more preferably 50 µm or more, and for example, 100 µm or less, preferably 80 µm or less, more preferably 60 µm or less.

The thickness of the easily releasing layer 6 with respect to that of the shape-holding layer 5 is, for example, 1% or more, preferably 5% or more, more preferably 10% or more, and for example, 50% or less, preferably 30% or less, more preferably 20% or less.

The easily releasing layer 6 is laminated on the shape-holding layer 5 by a known method. To be specific, for example, the shape-holding layer 5 may adhere to the easily releasing layer 6 by a known adhesive (not shown). In this manner, the easily releasing layer 6 is attached to the shape-holding layer 5, thereby producing the releasing layer 2.

The thickness of the releasing layer 2 (the total thickness of the shape-holding layer 5 and the easily releasing layer 6) is, for example, 150 µm or more, preferably 200 µm or more, more preferably 350 µm or more, and for example, 1000 µm or less, preferably 800 µm or less, more preferably 600 µm or less.

The pressure-sensitive adhesive layer 3 is, for example, formed of a known pressure-sensitive adhesive.

Examples of the pressure-sensitive adhesive include acrylic pressure-sensitive adhesives, urethane pressure-sensitive adhesives, epoxy pressure-sensitive adhesives, silicone pressure-sensitive adhesives, polyester pressure-sensitive adhesives, polyamide pressure-sensitive adhesives, vinyl alkyl ether pressure-sensitive adhesives, fluorine pressure-sensitive adhesives, and rubber pressure-sensitive adhesives.

These pressure-sensitive adhesives can be used alone or in combination of two or more.

As the pressure-sensitive adhesive, preferably, an acrylic pressure-sensitive adhesive is used.

The acrylic pressure-sensitive adhesive is, for example, a pressure-sensitive adhesive mainly composed of (meth) acrylic alkyl ester, and can be obtained by a known method.

The form of the pressure-sensitive adhesive is not particularly limited, and for example, various forms such as solid pressure-sensitive adhesive, solvent pressure-sensitive adhesive, emulsion pressure-sensitive adhesive, and oligomer pressure-sensitive adhesive can be used.

The method for laminating the pressure-sensitive adhesive layer 3 on the releasing layer 2 is not particularly limited, and for example, a pressure-sensitive adhesive is applied onto the surface of the releasing layer 2 by a known method, and heated as needed. In this manner, the pressure-sensitive adhesive layer 3 is laminated on the surface of the releasing layer 2.

The surface of the pressure-sensitive adhesive layer 3 has pressure-sensitive adhesive properties (surface tackiness).

The thickness of the pressure-sensitive adhesive layer 3 is, for example, 20 µm or more, preferably 30 µm or more, and for example, 100 µm or less, preferably 70 µm or less.

Although the details are described later, the skin layer 4 is included so as to impart design properties to an adherend (described later) when a molded sheet 10 (described later) obtained from the decorative sheet 1 is attached to the adherend (described later).

The skin layer 4 is, for example, formed into a sheet shape extending in the plane direction, and has a generally rectangular shape when viewed from the top.

Examples of the skin layer 4 include resin sheets, nonwoven fabrics, paper, and metal foils. These can be used alone or in combination of two or more. As the skin layer 4, preferably, a resin sheet is used.

The skin layer 4 is selected so that the shrinkage ratio and the softening start temperature are within a predetermined range.

The shrinkage ratio of the skin layer 4 is 0/1000 or more, preferably 2/1000 or more, more preferably 4/1000 or more, and 9/1000 or less, preferably 8/1000 or less, more preferably 5/1000 or less.

The shrinkage ratio of the skin layer 4 is preferably about the same as that of the shape-holding layer 5, and a difference between the shrinkage ratio of the skin layer 4 and that of the shape-holding layer 5 is, for example, 10/1000 or less, preferably 6/1000 or less, more preferably 5/1000 or less, and usually 0/1000 or more.

The softening start temperature of the skin layer 4 is 60° C. or more, preferably 63° C. or more, more preferably 65° C. or more, and 120° C. or less, preferably 100° C. or less, more preferably 85° C. or less.

The softening start temperature of the skin layer 4 is preferably lower than that of the shape-holding layer 5, and a difference between the softening start temperature of the skin layer 4 and that of the shape-holding layer 5 is, for example, 10° C. or more, preferably 15° C. or more, and usually 200° C. or less.

As the skin layer 4, preferably, one having the heat deflection temperature within a predetermined range is selected.

The heat deflection temperature of the skin layer 4 is, for example, 50° C. or more, preferably 52° C. or more, more preferably 54° C. or more, and for example, 200° C. or less, preferably 150° C. or less, more preferably 100° C. or less, further more preferably 74° C. or less.

The heat deflection temperature of the skin layer 4 is preferably lower than that of the shape-holding layer 5, and a difference between the heat deflection temperature of the skin layer 4 and that of the shape-holding layer 5 is, for example, 10° C. or more, preferably 15° C. or more, more preferably 20° C. or more, and usually 200° C. or less.

When the skin layer 4 is a resin sheet, the shrinkage ratio, the softening start temperature, and the heat deflection temperature differ in accordance with the type of the resin constituting the resin sheet, the structure thereof, or the like.

Thus, as the skin layer 4, preferably, the resin sheet having the shrinkage ratio, the softening start temperature, and the heat deflection temperature within the above-described range is selected.

To be specific, examples of the resin constituting the skin layer 4 (the resin sheet) include crystalline resins such as ethylene vinyl acetate (EVA, shrinkage ratio of 7/1000 to 9/1000, softening start temperature of 89 to 113° C., heat deflection temperature of 77 to 81° C.) and non-crystalline resins such as acrylonitrile•butadiene•styrene copolymer (ABS, shrinkage ratio of 0/1000 to 9/1000, softening start temperature of 95 to 105° C., heat deflection temperature of 95 to 110° C.), polystyrene (PS, shrinkage ratio of 4/1000 to 7/1000, softening start temperature of 95 to 105° C., heat deflection temperature of 70 to 90° C.), acrylonitrile•styrene copolymer (AS, shrinkage ratio of 2/1000 to 7/1000, softening start temperature of 110 to 120° C., heat deflection temperature of 87 to 104° C.), and polyvinyl chloride (PVC, shrinkage ratio of 1/1000 to 5/1000, softening start temperature of 65 to 85° C., heat deflection temperature of 54 to 74° C.).

These resins constituting the skin layer 4 can be used alone or in combination of two or more.

As the resin constituting the skin layer 4, preferably, crystalline resins are used, more preferably, polyvinyl chloride (PVC) is used.

When the above-described resin sheet is used as the skin layer 4, excellent shape-holding properties can be obtained.

The thickness of the skin layer 4 is, for example, 50 μm or more, preferably 100 μm or more, more preferably 150 μm or more, and for example, 500 μm or less, preferably 300 μm or less, more preferably 200 μm or less.

The thickness of the skin layer 4 with respect to that of the pressure-sensitive adhesive layer 3 is, for example, 100% or more, preferably 200% or more, more preferably 300% or more, and for example, 600% or less, preferably 500% or less, more preferably 400% or less.

The thickness of the skin layer 4 with respect to that of the releasing layer 2 is, for example, 10% or more, preferably 20% or more, more preferably 30% or more, and for example, 70% or less, preferably 60% or less, more preferably 50% or less.

The skin layer 4 is laminated on the surface of the pressure-sensitive adhesive layer 3 by a known method. In this manner, the releasing layer 2 is attached to the skin layer 4 via the pressure-sensitive adhesive layer 3, thereby producing the decorative sheet 1.

As shown by a broken line in FIG. 1, the decorative sheet 1 can further include a coating layer 7.

The coating layer 7 is, for example, disposed on the surface of the skin layer 4 so as to protect the skin layer 4.

The coating layer 7 is, for example, formed from a known coating agent.

Examples of the coating agent include acrylic coating agents, urethane coating agents, fluorine coating agents, and silicone coating agents.

These coating agents can be used alone or in combination of two or more.

As the coating agent, preferably, a fluorine coating agent is used.

The lamination method of the coating layer 7 is not particularly limited, and for example, a coating agent may be applied onto the surface of the skin layer 4 to be dried by a known method. In this manner, the coating layer 7 is laminated on the surface of the skin layer 4. Alternatively, separately from the skin layer 4, the coating layer 7 is formed, and the formed coating layer 7 can be also laminated on the skin layer 4 by an adhesive or the like.

As the coating layer 7, for example, a resin film (for example, acrylic resin film, urethane resin film, fluorine resin film, silicone resin film, or the like) can be also used. In such a case, the coating layer 7 (the resin film) is attached to the skin layer 4 via an adhesive as needed.

The thickness of the coating layer 7 is, for example, 20 μm or more, preferably 30 μm or more, and for example, 100 μm or less, preferably 70 μm or less.

The thickness (the total thickness) of the decorative sheet 1 is, for example, 300 μm or more, preferably 400 μm or more, and for example, 1000 μm or less, preferably 700 μm or less.

To achieve improvement of the design properties, an arbitrary design and pattern can be imparted to the decorative sheet 1 by a known method. For example, a design layer (not shown) having an arbitrary design and pattern can be interposed between the skin layer 4 and the pressure-sensitive adhesive layer 3, between the skin layer 4 and the coating layer 7, or the like. Also, the skin layer 4 or the coating layer 7 can be directly processed to impart an arbitrary design and pattern.

In the decorative sheet 1, both the shrinkage ratio of the shape-holding layer 5 and the shrinkage ratio of the skin layer 4 are 0/1000 to 9/1000, and both the softening start temperature of the shape-holding layer 5 and the softening start temperature of the skin layer 4 are 60° C. or more and 120° C. or less, so that deformation of the decorative sheet 1 into an undesired shape and damage thereto can be suppressed at the time of molding.

In the above-described description, the easily releasing layer 6 is interposed between the pressure-sensitive adhesive layer 3 and the shape-holding layer 5. Alternatively, for example, the decorative sheet 1 can be also obtained without using the easily releasing layer 6.

Figure 2:
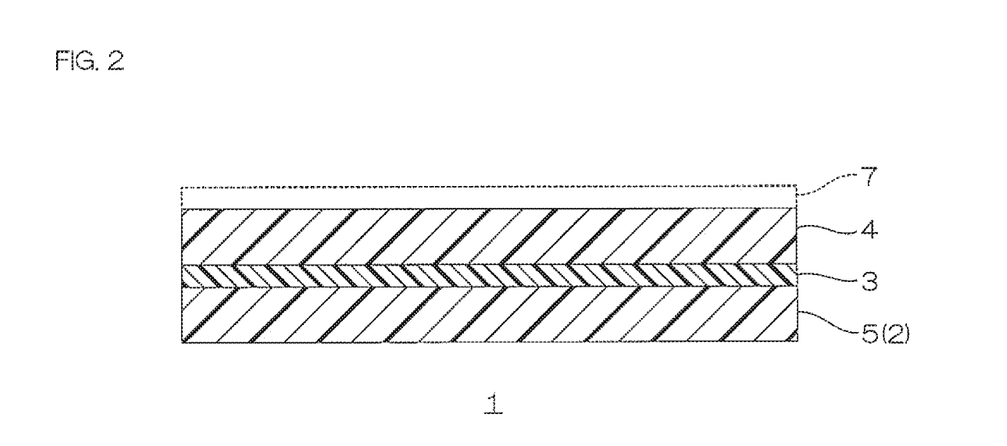
FIG. 2 shows a schematic configuration diagram for illustrating the other embodiment of a decorative sheet of the present invention.

In FIG. 2, the decorative sheet 1 includes the releasing layer 2, the pressure-sensitive adhesive layer 3 disposed on the surface of the releasing layer 2, and the skin layer 4 disposed on the surface of the pressure-sensitive adhesive layer 3. In FIG. 2, the releasing layer 2 does not include the easily releasing layer 6, and is made of only the shape-holding layer 5.

In FIG. 2, the shape-holding layer 5 has easy releasability.

To be more specific, the shape-holding layer 5 having easy releasability is a sheet having easy releasability with respect to the pressure-sensitive adhesive layer 3, that is, a sheet that is easily releasable from the pressure-sensitive adhesive layer 3 and a sheet for holding a desired shape and suppressing deformation of the decorative sheet 1 into a different shape from a desired shape at the time of molding (for example, heat molding) the decorative sheet 1 or the like.

As the shape-holding layer 5 having easy releasability, one having easy releasability with respect to the pressure-sensitive adhesive layer 3 is appropriately selected from the above-described shape-holding layer 5 (preferably, the resin sheet).

The shape-holding layer 5 having easy releasability can be also used by applying known easy release treatment to the surface (contact surface with the pressure-sensitive adhesive layer 3) of the above-described shape-holding layer 5 (preferably, the resin sheet).

As the easy release treatment, for example, known fluorine treatment or the like is used.

When the shape-holding layer 5 having easy releasability is used, the decorative sheet 1 can be obtained without interposing the easily releasing layer 6 between the pressure-sensitive adhesive layer 3 and the shape-holding layer 5, so that the production cost and the steps can be reduced.

The decorative sheet 1 is preferably used in the production of the molded sheet 10 (ref: FIG. 3D) that is three-dimensional processed into a three-dimensional shape. That is, the molded sheet 10 (ref: FIG. 3D) can be obtained by molding the above-described decorative sheet 1.

The molding method is not particularly limited, and heat molding such as vacuum molding and hot press molding is used. Preferably, vacuum molding is used. The molded sheet can be more efficiently obtained by vacuum molding.

In the following, the details of the method for producing the molded sheet by a vacuum molding method are described.

Figure 3A:
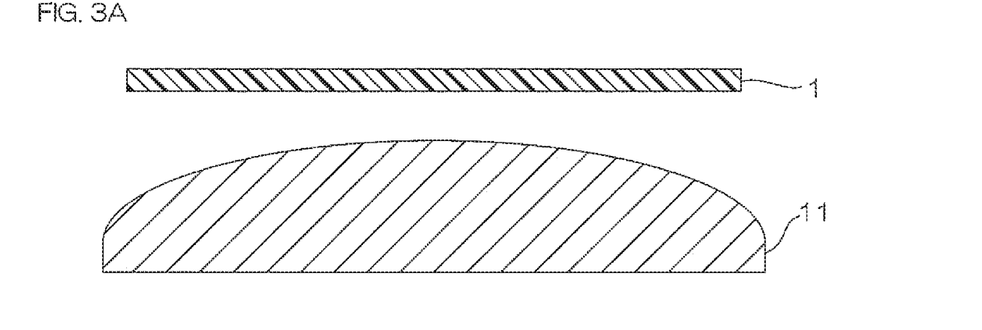
FIG. 3A illustrating a step of preparing a decorative sheet.

To be more specific, in this method, first, as shown in FIG. 3A, the above-described decorative sheet 1 is prepared (preparation step).

In the preparation step, a vacuum mold 11 for molding the decorative sheet 1 is prepared.

The vacuum mold 11 is a known mold. The shape of the vacuum mold 11 is not particularly limited, and a sticking surface of the decorative sheet 1 (that is, as described later, when the decorative sheet 1 is stuck to the vacuum mold 11, a contact surface (ref: FIG. 3C) of the decorative sheet 1 with the vacuum mold 11) is preferably the same shape as an attaching surface of the molded sheet 10 in the adherend (described later).

Next, in this method, the above-described decorative sheet 1 is vacuum molded by using the above-described vacuum mold 11.

Figure 3B:
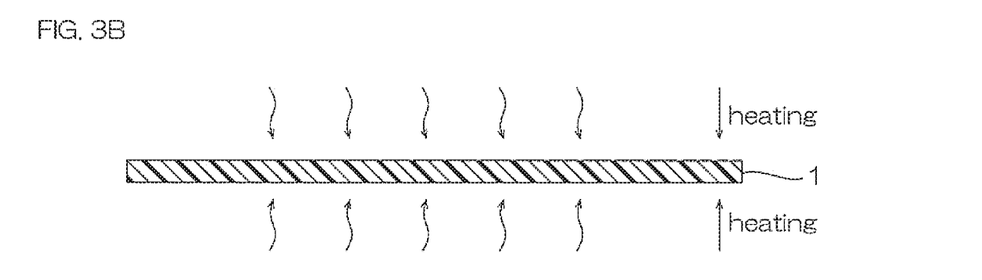
FIG. 3B illustrating a step of heating the decorative sheet.
Figure 3C:
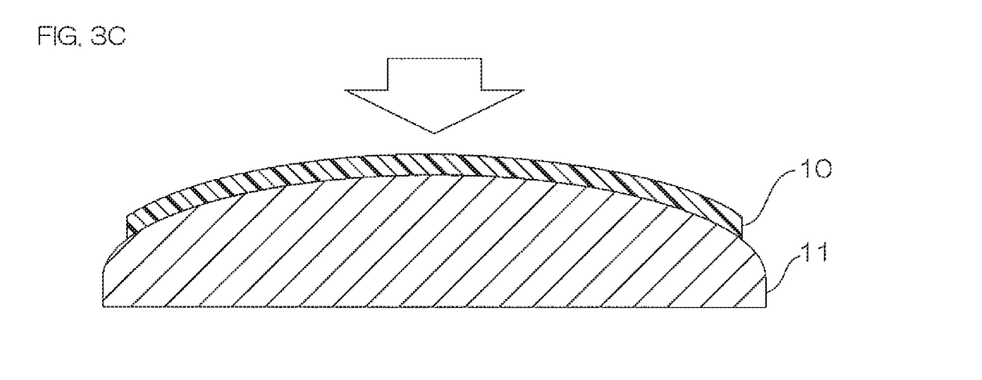
FIG. 3C illustrating a step of vacuum molding the decorative sheet.
Figure 3D:
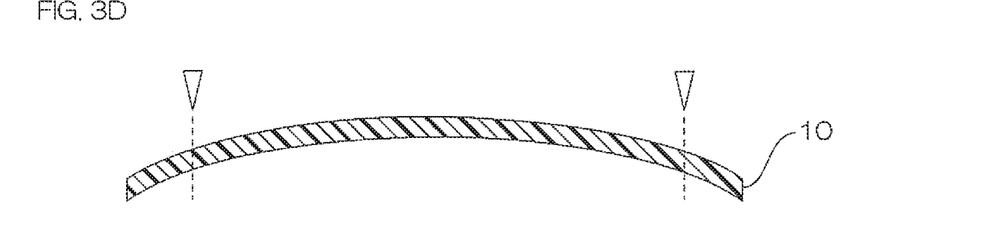
FIG. 3D illustrating a step of detaching the molded sheet from a vacuum mold.

To be more specific, in the method, as shown in FIG. 3B, the skin layer 4-side and the releasing layer 2-side of the decorative sheet 1 are heated (pre-heated).

The heating temperature (the pre-heating temperature) is appropriately set in accordance with the material of the decorative sheet 1. When the skin layer 4 of the decorative sheet 1 is, for example, a resin sheet, the heating temperature of the skin layer 4-side is set in accordance with the softening start temperature (and the heat deflection temperature as needed) of the resin sheet. When the releasing layer 2 of the decorative sheet 1 is a resin sheet, the heating temperature of the releasing layer 2-side is set in accordance with the softening start temperature (and the heat deflection temperature as needed) of the resin sheet.

To be more specific, for example, when the softening start temperature of the skin layer 4 is lower than that of the shape-holding layer 5, the heating temperature (the upper side of the paper surface in FIG. 2) of the skin layer 4-side is preferably set lower than the heating temperature (the lower side of the paper surface in FIG. 2) of the releasing layer 2-side.

In this case, the heating temperature of the skin layer 4-side is, for example, 110° C. or more, preferably 120° C. or more, more preferably 123° C. or more, and for example, below 140° C., preferably below 130° C., more preferably 127° C. or less.

The heating temperature of the releasing layer 2-side is, for example, 120° C. or more, preferably 130° C. or more, more preferably 133° C. or more, and for example, 150° C. or less, preferably 140° C. or less, more preferably 137° C. or less.

When the heating temperature is within the above-described range, the molded sheet 10 can be more efficiently obtained.

The heating time is, for example, 60 seconds or more, preferably 70 seconds or more, and for example, 150 seconds or less, preferably 100 seconds or less.

By the heating, the decorative sheet 1 is softened and capable of being molded.

Next, in this method, as shown in FIG. 3C, the decorative sheet 1 is vacuum compressively bonded to the vacuum mold 11 to be vacuum molded.

To be more specific, in this step, the decorative sheet 1 is disposed on the vacuum mold 11; then, the pressure therein is reduced by a pressure reduction means (not shown); and the air between the decorative sheet 1 and the vacuum mold 11 is removed.

In the vacuum molding, preferably, the vacuum mold 11 is heated at, for example, 70 to 90° C. (preferably, 80° C.).

As a result, the decorative sheet 1 is stuck to the vacuum mold 11 by the atmospheric pressure, and the decorative sheet 1 is deformed along the shape of the vacuum mold 11 at its contact surface. In this manner, the molded sheet 10 is obtained. At this time, when the vacuum mold 11 having the same size and the same shape of those of the adherend (described later) is used, the molded sheet 10 having the same size and the same shape as those of the adherend (described later) is obtained by the above-described vacuum molding.

Thereafter, in this method, the obtained molded sheet 10 is cooled, and as shown in FIG. 3D, is detached from the vacuum mold 11. Also, an unnecessary portion thereof is cut from the molded sheet 10 as needed (ref: the broken line).

The molded sheet 10 thus obtained is obtained by using the above-described decorative sheet 1, so that it has excellent processability and furthermore, excellent workability at the time of attachment.

According to the above-described method for producing the molded sheet 10, the molded sheet 10 can be efficiently produced.

The above-described molded sheet 10 is attached to the adherend.

The adherend is not particularly limited, and examples thereof include automobile interior and exterior materials such as automobile bumpers, roof panels, instrument panels, door trims, and pillars and interior and exterior materials of buildings. Preferably, an automobile exterior material is used.

As the attachment method of the molded sheet 10, for example, first, the releasing layer 2 is peeled. Next, the skin layer 4 is compressively bonded (attached) to the adherend via the pressure-sensitive adhesive layer 3.

In this manner, the molded sheet 10 is attached to the adherend, and the design properties are easily imparted to the adherend.

Thus, the decorative sheet 1 and the molded sheet 10 described above are preferably used in various industrial fields that require the design properties, to be specific, various exterior fields and various interior fields of vehicles such as automobiles and furthermore, buildings and furniture.

In the above-described description, the decorative sheet 1 is three-dimensional molded into a three-dimensional shape by vacuum molding to make it into the molded sheet 10. However, for example, the decorative sheet 1 can be also used as the molded sheet 10 without being molded. Furthermore, the decorative sheet 1 can be also used as the molded sheet 10 by only flattening such as cutting without being three-dimensional molded.

EXAMPLES

Next, the present invention is described based on Examples and Comparative Examples. The present invention is however not limited by the following Examples. All designations of "part" or "parts" and "%" mean part or parts by mass and % by mass, respectively, unless otherwise particularly specified in the following description. The specific numerical values in mixing ratio (content ratio), property value, and parameter used in the following description can be replaced with upper limit values (numerical values defined as "or less" or "below") or lower limit values (numerical values defined as "or more" or "above") of corresponding numerical values in mixing ratio (content ratio), property value, and parameter described in the above-described "DESCRIPTION OF EMBODIMENTS".

The properties described in Examples and Comparative Examples are described in the following.

<Shrinkage Ratio>

The shrinkage ratio is measured in conformity with JIS K 7152 (1999).

<Softening Start Temperature>

The softening start temperature is measured in conformity with JIS K 7196 (1999).

<Heat Deflection Temperatire>

The heat deflection temperature is measured in conformity with ASTM D648. To be specific, the heat deflection temperature is the temperature at which in a state of applying a load (4.6 kg/cm$^2$) determined in the standard of the test method, the temperature of a sample is increased and a degree of deflection shows a predetermined value (0.26 mm).

Example 1

As an easily releasing layer, a polypropylene resin sheet (PP, shrinkage ratio of 10 to 20/1000, softening start temperature of 160 to 170° C., heat deflection temperature of 95 to 110° C.) having a thickness of 50 to 60 μm was prepared.

Next, as a shape-holding layer, an acrylonitrile•butadiene•styrene copolymer sheet (ABS, shrinkage ratio of 4 to 6/1000, softening start temperature of 95 to 105° C., heat deflection temperature of 95 to 110° C.) having a thickness of 300 to 500 μm was attached to the polypropylene resin sheet (the easily releasing layer) via a urethane adhesive. In this manner, a releasing layer was obtained.

Next, an acrylic pressure-sensitive adhesive (pressure-sensitive adhesive layer) was applied to the surface of the polypropylene resin sheet-side (the easily releasing layer-side) of the releasing layer. Next, as a skin layer, a polyvinyl chloride resin sheet (PVC, shrinkage ratio of 4 to 5/1000, softening start temperature of 65 to 85° C., heat deflection temperature of 54 to 74° C.) having a thickness of 150 to 200 μm was attached to the releasing layer via the acrylic pressure-sensitive adhesive.

Thereafter, a fluorine resin film was attached to the surface of the polyvinyl chloride resin sheet-side (the skin layer-side), thereby producing a coating layer.

In this manner, a decorative sheet including the releasing layer (the shape-holding layer and the easily releasing layer), the pressure-sensitive adhesive layer, the skin layer, and the coating layer was obtained.

The obtained decorative sheet was molded by a method shown below, thereby producing a molded sheet.

That is, first, both surfaces of the decorative sheet were heated (pre-heated) with a heating device for 70 to 100 seconds. In the heating, the heating temperature of the skin layer-side was set to 125° C., and the heating temperature of the releasing layer-side was set to 135° C.

Next, the decorative sheet was vacuum molded and cooled to be then released with a vacuum molding device (model number: CLC-541, manufactured by Asano Laboratories, Co., Ltd.) by using a vacuum mold (80° C.) in an automobile roof shape.

In this manner, the molded sheet was obtained. The appearance of the obtained molded sheet was visually evaluated. The results are shown in Table 1.

Example 2 and Comparative Examples 1 to 3

Decorative sheets were obtained in the same manner as that of Example 1, except that the skin layer, the pressure-sensitive adhesive layer, the releasing layer, and the coating layer described in Table 1 were used. In Example 2 and Comparative Examples 1 to 3, only the shape-holding layer that was subjected to easy release treatment with fluorine treatment was used without using the easily releasing layer.

Also, each of the molded sheets was obtained in the same manner as that of Example 1 by using the obtained decorative sheet. The appearance of the obtained molded sheet was visually evaluated. The results are shown in Table 1.

TABLE 1

| No. | | Ex. 1 | Ex. 2 | Comp. Ex. 1 | Comp. Ex. 2 | Comp. Ex. 3 |
|---|---|---|---|---|---|---|
| Coating Layer | | Fluorine Resin Film | Fluorine Resin Film | Fluorine Resin Film | Fluorine Resin Film | Fluorine Resin Film |
| Skin Layer | Resin Sheet | PVC | PVC | PVC | PC | PVC |
| | Shrinkage Ratio | 4 to 5/1000 | 4 to 5/1000 | 4 to 5/1000 | 5 to 7/1000 | 4 to 5/1000 |
| | Softening Start Temperature (° C.) | 65 to 85 | 65 to 85 | 65 to 85 | 140 to 160 | 65 to 85 |
| | Heat Defection Temperature (° C.) | 54 to 74 | 54 to 74 | 54 to 74 | 130 to 140 | 54 to 74 |
| | Thickness (μm) | 190 | 190 | 190 | 190 | 190 |

TABLE 1-continued

| No. | | | Ex. 1 | Ex. 2 | Comp. Ex. 1 | Comp. Ex. 2 | Comp. Ex. 3 |
|---|---|---|---|---|---|---|---|
| Pressure-Sensitive Adhesive Layer | | | Acrylic Pressure-Sensitive Adhesive | Acrylic Pressure-Sensitive Adhesive | Acrylic Pressure-Sensitive Adhesive | Acrylic Pressure-Sensitive Adhesive | Acrylic Pressure-Sensitive Adhesive |
| Releasing Layer | Easily Releasing Layer | Resin Sheet | PP | — | — | — | — |
| | | Shrinkage Ratio | 10 to 20/1000 | | | | |
| | | Softening Start Temperature (° C.) | 160 to 170 | | | | |
| | | Heat Deflection Temperature (° C.) | 95 to 110 | | | | |
| | | Thickness (μm) | 50 | | | | |
| | Shape-Holding Layer | Resin Sheet | ABS | ABS | PP | ABS | PET |
| | | Shrinkage Ratio | 4 to 6/1000 | 4 to 6/1000 | 10 to 20/1000 | 4 to 6/1000 | 2 to 4/1000 |
| | | Softening Start Temperature (° C.) | 95 to 105 | 95 to 105 | 160 to 170 | 95 to 105 | 250 to 260 |
| | | Heat Deflection Temperature (° C.) | 95 to 110 | 95 to 110 | 95 to 110 | 95 to 110 | 240 to 245 |
| | | Thickness (μm) | 360 | 360 | 360 | 360 | 360 |
| Evaluation | | | Normal | Normal | Spring Back by Differential Shrinkage | Melting Deformation of Releasing Layer | Melting of Skin Layer |

The details of the abbreviations in Table are shown in the following.

PVC: polyvinyl chloride resin sheet
PP: polypropylene resin sheet
ABS: acrylonitrile•butadiene•styrene copolymer sheet
PC: polycarbonate resin sheet
PET: polyethylene terephthalate resin sheet In Table, "normal" means that molding into a desired shape can be achieved.

The spring back means that rewinding of the decorative sheet occurs at the time of molding, and molding into a desired shape cannot be achieved.

The melting deformation of the releasing layer means that melting deformation of the releasing layer (the resin sheet) occurs at the time of molding, and molding into a desired shape cannot be achieved.

The melting of the skin layer means that melting of the skin layer (the resin sheet) occurs at the time of molding, and molding into a desired shape cannot be achieved.

While the illustrative embodiments of the present invention are provided in the above description, such is for illustrative purpose only and it is not to be construed as limiting the scope of the present invention. Modification and variation of the present invention that will be obvious to those skilled in the art is to be covered by the following claims.

INDUSTRIAL APPLICABILITY

The decorative sheet, the molded sheet, and the method for producing the molded sheet of the present invention are preferably used in decoration of automobile interior and exterior materials such as automobile bumpers, roof panels, instrument panels, door trims, and pillars and in addition, interior and exterior materials of buildings.

DESCRIPTION OF THE REFERENCE NUMERALS

1 Decorative sheet
2 Releasing layer
3 Pressure-sensitive adhesive layer
4 Skin layer
5 Shape-holding layer

The invention claimed is:

1. A decorative sheet comprising:
a releasing layer, a pressure-sensitive adhesive layer disposed on a surface of the releasing layer, and a skin layer disposed on a surface of the pressure-sensitive adhesive layer, wherein
the releasing layer includes a shape-holding layer,
both the shrinkage ratio of the shape-holding layer and the shrinkage ratio of the skin layer are 0/1000 to 9/1000,
both the softening start temperature of the shape-holding layer and the softening start temperature of the skin layer are 60° C. or more and 120° C. or less,
the shape-holding layer includes acrylonitrile butadiene styrene copolymer, and
the skin layer includes polyvinyl chloride.

2. The decorative sheet according to claim 1, wherein the releasing layer further includes an easily releasing layer interposed between the pressure-sensitive adhesive layer and the shape-holding layer.

3. The decorative sheet according to claim 1, wherein the shape-holding layer has easy releasability.

4. A molded sheet obtained by molding the decorative sheet according to claim 1.

5. The molded sheet according to claim 4, wherein the decorative sheet is obtained by vacuum molding.

6. The decorative sheet according to claim 2, wherein the easily releasing layer includes polypropylene.

* * * * *